(12) United States Patent
Mizuno

(10) Patent No.: US 6,385,998 B1
(45) Date of Patent: May 14, 2002

(54) METHOD OF MANUFACTURING GLASS SPACERS

(75) Inventor: Toshiaki Mizuno, Osaka (JP)

(73) Assignee: Nippon Sheet Glass Co. Ltd. (JP)

( * ) Notice: Subject to any disclaimer, the term of this patent is extended or adjusted under 35 U.S.C. 154(b) by 0 days.

(21) Appl. No.: 09/478,453

(22) Filed: Jan. 6, 2000

(30) Foreign Application Priority Data

Jan. 8, 1999 (JP) .............................. 11-002994

(51) Int. Cl.[7] .............................. C03B 21/02
(52) U.S. Cl. .............................. 65/105; 65/102
(58) Field of Search .............................. 65/102, 105

(56) References Cited

U.S. PATENT DOCUMENTS 3,607,485 A * 9/1971 Bailey et al.
5,910,703 A * 6/1999 Kuo et al. .............................. 313/482

FOREIGN PATENT DOCUMENTS

| JP | 7-144939 | 6/1995 |
|---|---|---|
| JP | 7-230776 | 8/1995 |

* cited by examiner

Primary Examiner—Christopher A. Fiorilla
(74) Attorney, Agent, or Firm—Rossi & Associates

(57) ABSTRACT

A method of manufacturing glass spacers is provided which can enhance the degree of similarity in cross section between the mother glass and the drawn glass when manufacturing glass spacers by hot drawing the mother glass. A mother glass having a similar cross section to a desired cross section of the glass spacers is prepared. The mother glass is drawn while it is heated to a viscosity of $10^5$ to $10^9$ poise.

7 Claims, 4 Drawing Sheets

METHOD OF MANUFACTURING GLASS SPACERS

BACKGROUND OF THE INVENTION

1. Field of the Invention

The present invention relates to a method of manufacturing glass spacers and, more particularly, to a method of manufacturing glass spacers for electron beam-excited displays.

2. Prior Art

The conventional cathode ray tube (CRT) which is bulky and heavyweight has been replaced to an increasing extent by so-called flat panel displays which are thin and lightweight. The flat panel displays include liquid crystal displays. It is, however, expected that the liquid crystal displays will be replaced by light emitting type electron beam-excited displays, such as FEDs (Field Emission Displays) which generate fluorescence by irradiating an electron beam from an electron beam source on a fluorescent material or fluophor to thereby form images on the fluorescent material. Compared to the liquid crystal displays, these flat panel electron beam-excited displays provide images which are brighter and have a wider angle of view.

To form images through irradiation of the electron beam on the fluorescent material, however, the electron beam source, fluorescent material, and other components of the electron beam-excited display are necessarily incorporated in a vacuum casing under a vacuum atmosphere of the order of $10^{-5}$ Torr or less. To support this kind of vacuum casing, an atmospheric pressure-resistant structure has been proposed, e.g. by Japanese Laid-Open Patent Publication (Kokai) No. 7-230776, which is described hereinbelow:

FIG. 1 is an exploded perspective view of the proposed flat panel electron beam-excited display. The flat panel electron beam-excited display in FIG. 1 is comprised of a face panel 1, which is formed of a glass plate 15 and an image forming member 5 deposited on the inner surface of the glass plate 15, and a back panel 2, on which a group of electron emitting devices, described later, are mounted. The image forming member 5 contains a fluorescent material or fluophor which emits light when irradiated with electron beams emitted from the electron emitting devices. The face panel 1 and the back panel 2 are joined together in an airtight manner by a support frame 3 as shown in FIG. 2, which is a cross-sectional view taken along line A—A in FIG. 1. The face panel 1, the back panel 2 and the support frame 3 define a hermetic atmospheric pressure-resistant structure. In addition, a plurality of glass spacers 4 are inserted between the face panel 1 and the back panel 2 as atmospheric pressure-resistant support members.

Each glass spacer 4 is formed of a tabular panel of a size of, for example, 0.2 mm in thickness and 5 mm in height. The glass spacer 4 is fixed at its lower end to the back panel 2 by a bonding material 8. Alternatively, the glass spacer 4 may be fixed at its upper end to the face panel 1 by the bonding material 8, or it may be fixed at its upper and lower ends to the face panel 1 and the back panel 2, respectively, by the bonding material 8.

The back panel 2 is comprised of a glass substrate 21, a multiplicity of element sections 23 arranged in a matrix array on the upper surface of the glass substrate 21, which are formed of nickel and have a thickness of 1000 angstroms, and a plurality of wiring sections 24 arranged on the upper surface of the glass substrate 21 to feed electric power to the element sections 23, which are formed of silver and have a thickness of 2 $\mu$m. Each element section 23 has an electron emission element 25 formed thereon. The wiring sections 24 are arranged so as to provide a wiring pattern of parallel lines. Each pair of adjacent wiring sections 24 simultaneously feed electric power to a plurality of electron emitting devices 25 arranged along the wiring sections 24. Further, modulating electrodes, not shown, are arranged on the upper surface of the glass substrate 21 via a $SiO_2$ insulating layer, which have electron passage holes of a diameter of 50 $\mu$m at a location 10 $\mu$m above the upper surface of the glass substrate 21.

Each glass spacer 4 is located relative to the back panel 2 such that the glass spacer 4 abuts on a wiring section 24 positioned between two rows of electron emitting devices 25 on the back panel 2. Each glass spacer 4 is located relative to the face panel 1 such that the glass spacer 4 abuts on a black stripe section of the image forming member 5, which is a portion of the fluorescent material not irradiated with the electrons emitted from the electron emitting devices 25.

Glass spacers 4 configured and arranged as above are manufactured by drawing a mother glass having a similar cross section to that of the glass spacer while heating the same to the softening point to obtain a drawn glass, and then cutting the obtained drawn glass into a suitable length, as disclosed, e.g. by Japanese Laid-Open Patent Publication (Kokai) No. 7-144939.

To produce such glass spacers by means of hot drawing with high precision, it is desirable that similarity in cross section between the mother glass and the drawn glass, specifically, the aspect ratio (height-to-thickness ratio) should be maintained to the maximum possible degree when producing the drawn glass by hot drawing the mother glass. If the similarity in cross section is maintained, it will be possible to obtain a glass spacer with a desired cross section by selecting a suitable cross section of mother glass.

In drawing the mother glass while heating the same to obtain a drawn glass, if the heating temperature is too high, the mother glass becomes too soft to maintain a desired similarity in cross section between the mother glass and the drawn glass, whereas, if the heating temperature is too low, the mother glass becomes too hard to draw and can be ruptured.

SUMMARY OF THE INVENTION

It is therefore an object of the present invention to provide a method of manufacturing glass spacers which can enhance the degree of similarity in cross section between the mother glass and the drawn glass when manufacturing glass spacers by hot drawing the mother glass.

To attain the above object, the present invention provides a method of manufacturing glass spacers, comprising the steps of preparing a mother glass having a similar cross section to a desired cross section of the glass spacer, and drawing the mother glass while heating the same to a viscosity of $10^5$ to $10^9$ poise.

Preferably, the mother glass is heated to a viscosity of $10^8$ to $10^9$ poise.

More preferably, the method of manufacturing glass spacers further comprises the step of feeding the mother glass at a predetermined feed speed while drawing the mother glass at a predetermined drawing speed, wherein the predetermined drawing speed and the predetermined feed speed are in a ratio of 20 to 4000.

In a preferred embodiment of the invention, the glass spacers are tabular and have a thickness of 0.03 to 0.25 mm.

Further, in a preferred embodiment of the invention, the glass spacers are tabular and have a height of 0.7 to 5.0 mm.

Further, the glass spacers are typically suitable for use in electron beam-excited displays.

The above and other objects, features and advantages of the invention will become more apparent from the following detailed description taken in conjunction with the accompanying drawings.

BRIEF DESCRIPTION OF THE DRAWINGS

FIGS. 6A to 6C are perspective views showing shapes of the glass spacer obtained by drawing the mother glass in the longitudinal direction of the glass spacer, in which:

FIG. 6A shows a shape of a simple rectangular cross section;

FIG. 6B shows a shape of a cross section having V-shaped grooves on its opposite lateral sides; and FIG. 6C shows a shape of a cross section having U-shaped grooves on its opposite lateral sides;

FIGS. 7A and 7B are perspective views showing shapes of the glass spacer obtained by drawing the mother glass in the transverse direction of the glass spacer, in which:

FIG. 7A shows a shape of a simple rectangular cross section; and

FIG. 7B shows a shape of a cross section having wide grooves on its opposite lateral sides.

DETAILED DESCRIPTION

The method of manufacturing glass spacers according to the present invention will now be described in detail with reference to the drawings showing a preferred embodiment thereof.

Figure 1:
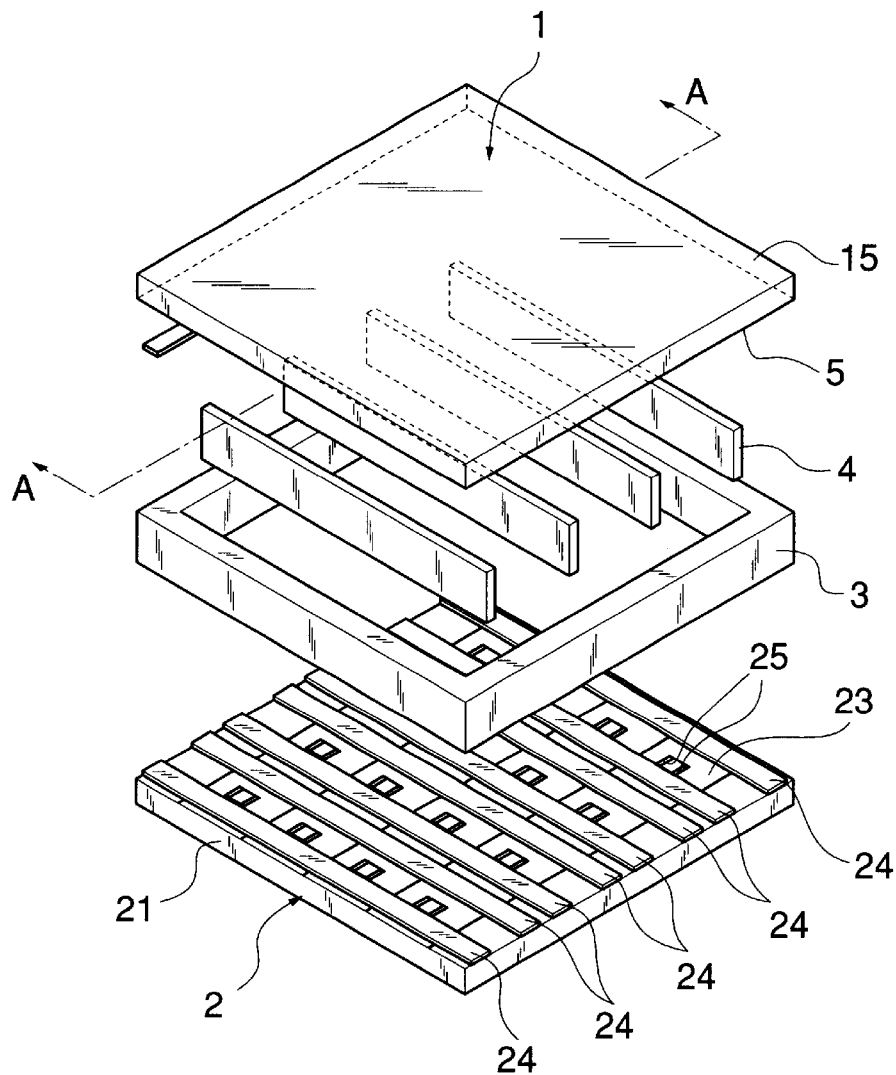
FIG. 1 is an exploded perspective view of a conventional flat panel electron beam-excited display.
Figure 2:
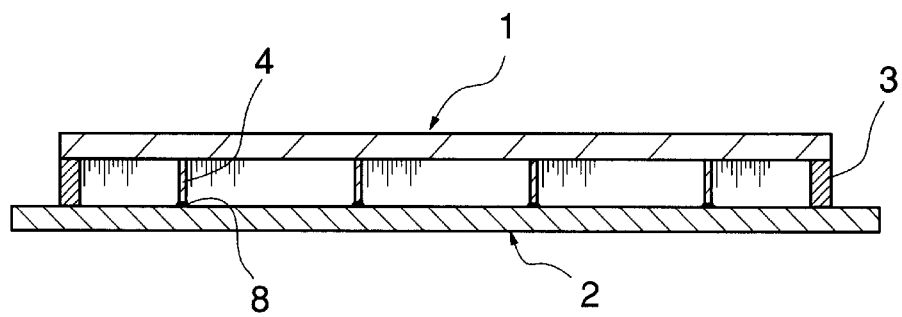
FIG. 2 is a cross-sectional view taken along line A—A in FIG. 1.

Glass spacers according to the present invention are typically used in a flat panel electron beam-excited display as described hereinbefore and shown in FIGS. 1 and 2, in which a plurality of glass spacers 4 are inserted between the face panel 1 and the back panel 2 as atmospheric pressure-resistant support members.

Each glass spacer 4 is formed of a tabular panel of a size of, for example, 0.2 mm in thickness and 5 mm in height. The glass spacer 4 is fixed at its lower end to the back panel 2 by a bonding material 8. Alternatively, the glass spacer 4 may be fixed at its upper end to the face panel 1 by the bonding material 8, or it may be fixed at its upper and lower ends to the face panel 1 and the back panel 2, respectively, by the bonding material 8. The aspect ratio (height-to-thickness ratio) of the cross section of the glass spacer 4 is generally 4 to 50.

It is preferable that the thickness of glass spacer 4 is 0.03 to 0.25 mm. The thickness should be as small as possible since the display cannot be performed by luminescence at a portion where the glass spacer 4 abuts on the face panel 1 or the back panel 2. However, when the thickness is less than 0.03 mm, the absolute strength of the glass spacer 4 is too small and the glass spacer 4 becomes difficult to handle. On the other hand, the glass spacers are arranged in alignment with the respective wiring sections 24 in order to secure a sufficient opening ratio or display area of the display, and the thickness of the wiring section is generally 0.25 mm at maximum. Therefore, it is not advantageous that the glass spacer has a larger thickness than that of the wiring section 24.

The height of the glass spacer 4 is generally 0.7 to 5 mm, and preferably 1 to 5 mm. In order for the fluorescent material to fully exhibit its performance, the flat panel electron beam-excited display uses a high accelerating voltage which is generally on the order of 5000 to 6000 volts. Therefore, if the distance between the face panel 1 and the back panel 2 is less than 1 mm, it becomes difficult to maintain electrical insulation between the panels. On the other hand, if the panels are separated by a distance greater than 5 mm, the electron beam emitted from the electron beam source spreads out to cause adjacent picture elements to become undesirably luminous.

The length of the glass spacer 4 is determined depending on the size and manufacturing method of the display, and is generally 10 to 600 mm.

Glass spacers 4 configured and arranged as above are manufactured by drawing a mother glass having a similar cross section to that of the glass spacer, for example, a cross section having a predetermined aspect ratio (height-to-thickness ratio) while heating the mother glass to the softening point at and above which the glass is substantially softened and deformed, and then cutting the drawn glass into a suitable length.

Figure 3:
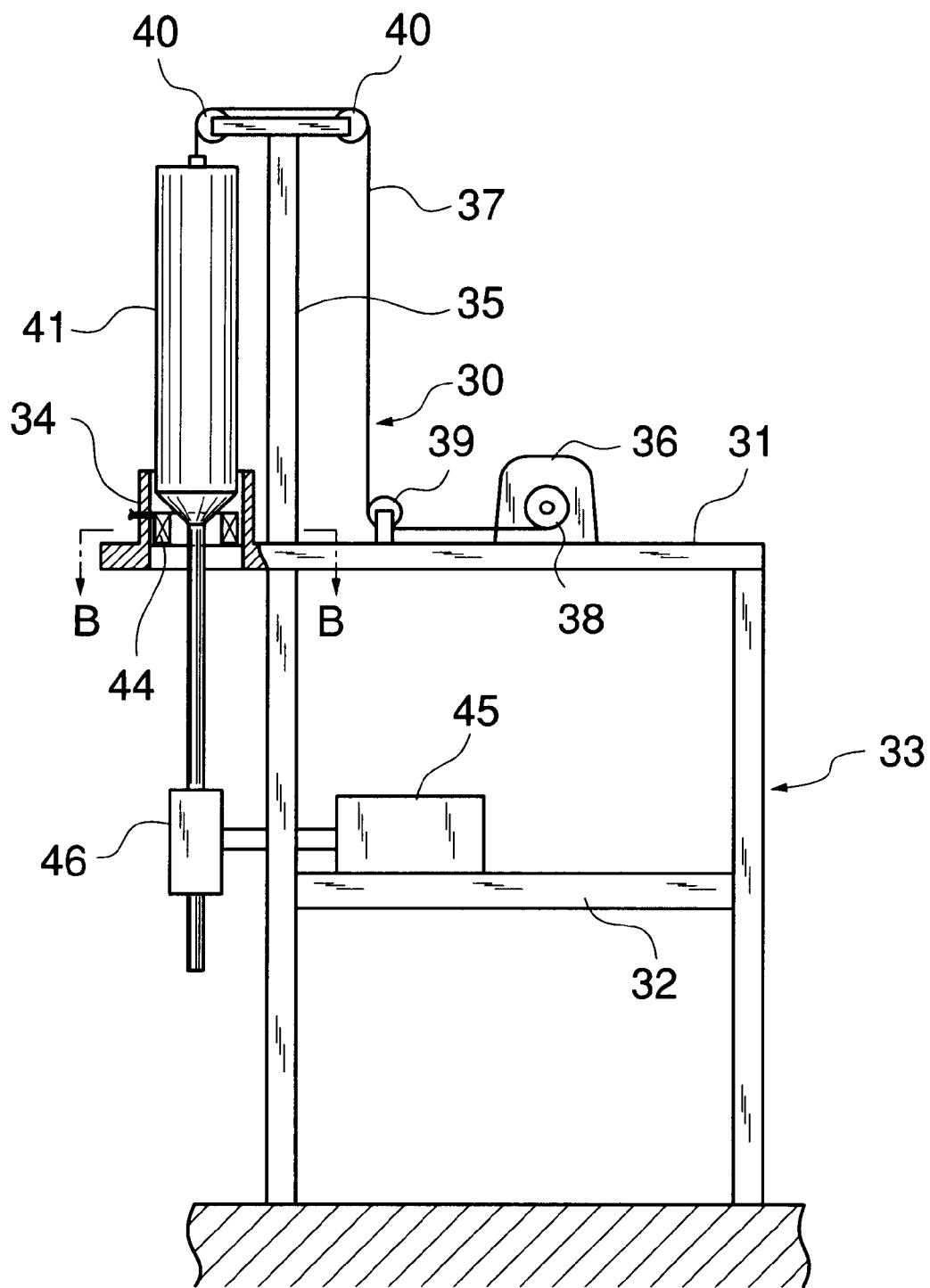
FIG. 3 is a schematic view showing the configuration of a manufacturing apparatus which implements the method of manufacturing glass spacers according to the present invention.

FIG. 3 shows the configuration of an apparatus 30 for manufacturing glass spacers for flat panel electron beam-excited displays. The manufacturing apparatus 30 includes a table 33 which is comprised of an upper stage 31 and a middle stage 32. The upper stage 31 has an extension at one side thereof, on which is mounted a tubular heating furnace 34, which will be described later.

A T-shaped support 35 is erected on the upper stage 31 in opposed relation to the heating furnace 34, and a motor 36 is placed adjacent to the support 35. A wire 37 is wound around a pulley 38 placed on a driving shaft of the motor 36, a pulley 39 placed on the upper stage 31, and a pair of pulleys 40, 40 placed on an upper end of the support 35, with one end of the wire 37 secured to an upper end of a mother glass 41. A lower end of the mother glass 41 is introduced into the heating furnace 34. The rotational speed of the driving shaft of the motor 36 is controlled by a control unit, not shown, to thereby control the speed at which the mother glass 41 is fed into the heating furnace 34.

Figure 4:
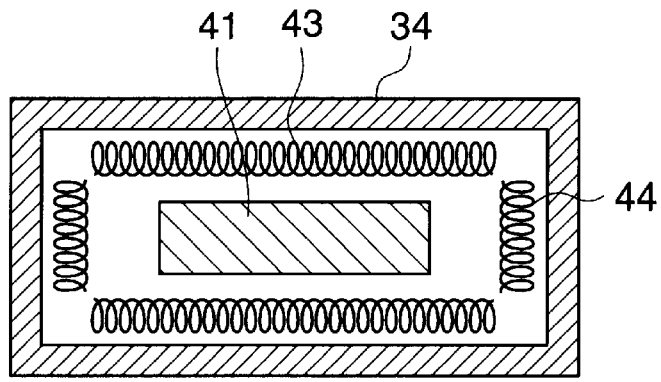
FIG. 4 is a cross-sectional view taken along line B—B in FIG. 3.

As shown in FIG. 4, which is a cross-sectional view taken along line B—B in FIG. 3, two pairs of electric heaters are provided in the tubular heating furnace 34 to heat the lower end of the mother glass 41, of which one pair of electric heaters 43 is positioned to face longer sides of the lower end of the mother glass 41, and another pair of electric heaters 44 is positioned to face shorter sides of the same. The electric heaters 43 and 44 are connected to the above-mentioned control unit, such that the operations of the electric heaters 43 and electric heaters 44 are independently controlled by the control unit.

Further, a motor 45 is mounted on top of the middle stage 32 of the table 33. The driving shaft of the motor 45 is coupled to a pair of draw rollers 46, which tightly grips and draws the glass drawn downward from the mother glass 41. The rotational speed of the driving shaft of the motor 45 is also controlled by the control unit, and thus the rotational speed of the draw rollers 46 are controlled, to thereby control the drawing speed of the mother glass 41.

With the above described arrangement, the mother glass 41 is fed into the heating furnace 34 at a predetermined feed speed, and at the same time the mother glass 41 is drawn at a predetermined drawing speed. The drawn glass thus obtained is cut into a suitable length, to obtain glass spacers 4.

The present inventor has reached a finding that drawn glass obtained by heating the mother glass 41 such that it has a viscosity of $10^5$ to $10^9$ poise, and preferably $10^8$ to $10^9$ poise, maintains a similarity in cross section to that of the mother glass 41. If the viscosity of the glass when heated is less than $10^5$ poise, desired similarity in cross section cannot be achieved. On the other hand, if the viscosity of the glass is greater than $10^9$ poise, the softening degree of the glass will be too low and the mother glass 41 cannot be drawn but can be ruptured.

Further, the present inventor has also found that the drawn glass obtained by heating and drawing the mother glass 41 within the above viscosity range has four corners thereof rounded due to the decreased viscosity of the glass and the surface tension of the glass, however, a flat portion remains at a central portion of each surface side of the drawn glass in the direction of the width thereof. This flat portion can contribute to increased contact stability of the glass spacers 4 with respect to the face panel 1 and the back panel 2. In addition, the curvature of each corner of the drawn glass changes with the heating temperature (the viscosity of the glass). More specifically, the curvature becomes smaller as the drawing is conducted at a higher temperature (lower viscosity). The roundness of the corner can prevent the glass spacers 4 from injuring pre-accumulated layers on the face panel 1 and the back panel 2, and further, can prevent the glass spacers 4 from scratching the face panel 1 and the back panel 2 when the glass spacers 4 are inserted between the panels.

Now, the method of manufacturing glass spacers for flat panel electron beam-excited displays will be described.

1st Step

First, a glass material is subjected to usual machining such as chopping, cutting and grinding, followed by welding and hot pressing/hot extrusion, etc., to prepare the mother glass 41 which has a similar cross section to that of the required glass spacer 4, for example, a cross section having a predetermined aspect ratio (height-to-thickness ratio). The thus processed mother glass 41 has a cross-sectional area 100 to 5000 times as large as that of the required glass spacer 4. The length of the mother glass 41 is determined by dimensional constraints and others of the manufacturing apparatus 30, but should preferably be as large as possible from a standpoint of storage space saving.

2nd Step

The mother glass 41 prepared by the first step is mounted onto the manufacturing apparatus 30 by suspending it from one end of the wire 37. Then, the driving shaft of the motor 36 is rotated to introduce the lower end of the mother glass 41 into the heating furnace 34. Then, the electric heaters 43 and 44 are energized so that the heating furnace 34 heats the lower end of the mother glass 41. Glass which is drawn downward from the mother glass 41 by this heating is passed through the draw rollers 46, and is pulled downward by the draw rollers 46 which are rotated by the motor 45.

Thereafter, the motors 36 and 45 are controlled to introduce the mother glass 41 into the heating furnace 34 at a predetermined feed speed, described later, and simultaneously pull the mother glass 41 downward at a predetermined drawing speed, also described later. During the feeding and drawing, the electric heaters 43 and 44 are controlled to maintain the heating temperature of the mother glass 41 within a predetermined range. That is, the mother glass 41 is heated to a temperature within a predetermined temperature range so that its viscosity is $10^5$ to $10^9$ poise, and more preferably, $10^8$ to $10^9$ poise. For example, when the material of the mother glass 41 is soda lime quartz glass, the predetermined temperature range would be 660 to 930° C., and more preferably be 660 to 720° C.

The ratio of the drawing speed to the feed speed of the mother glass 41 is preferably 20 to 4000. If the ratio is below 20, the mother glass 41 is drawn at too low a drawing rate, leading to degraded productivity, whereas, if the ratio exceeds 4000, the drawing rate becomes too large, leading to an unstable cross section perpendicular to the drawing direction of the drawn glass. Preferably, the ratio is in a range of 100 to 2000.

3rd Step

Next, the drawn glass is cut into a desired length to obtain the glass spacers 4. Cutting is performed by means of a diamond saw, glass cutter, water jet, or the like. The four surfaces other than the cut surface of the glass spacers 4 become almost fire polished surfaces during the hot drawing process, and therefore the machining accuracy of the original or mother glass is not so significant. The fire polished surface refers to a glass surface, for example, of a tabular glass which is formed by controlling the heating temperature of the molten glass, with the molten glass being out of contact with a forming die or others, utilizing the fact that the viscosity of the glass depends on the heating temperature. Therefore, the fire polished surface is free of micro irregularities as transferred from those on the forming die and therefore is microscopically flat.

The above three steps describe the method of manufacturing the glass spacers 4 from the mother glass 41 such that the glass spacers 4 have a desired cross section similar to that of the mother glass 41.

Now, an example of the method of the present invention will be described.

EXAMPLE

First, mother glasses 41 formed of soda lime quartz glass, low alkali glass, and no-alkali glass having compositions and properties shown in Table 1 were prepared as Examples Nos. 1 to 14 according to the present invention and Comparative Examples Nos. 15 to 19 having a cross-sectional size and an aspect ratio A shown in Table 2. Then, the glasses were heated and drawn under manufacturing conditions (feed speed and drawing speed, and viscosity/temperature) shown in Table 2, to obtain drawn glasses.

Then, an aspect ratio B of each of the obtained drawn glasses was measured. Then, an aspect ratio proportion value R (=(B/A)×100%) was calculated to evaluate the similarity between the cross sections. In addition, each drawn glass was examined to check the presence of a flat portion at a central portion of each side surface in the direction of the width thereof. The results are shown in Table 2.

It is clear from the results in Table 2 that each of the Comparative Examples Nos. 15, 18 and 19, which showed values of viscosity below the range of the present invention, $10^{4.2}$, $10^{4.0}$ and $10^{3.9}$ poise, respectively, had low R values (proportion or ratio between the aspect ratios A and B), 36.7, 28.0 and 16.8, respectively, and none of them had a flat portion formed on each side surface of the drawn glass. Both Comparative Examples Nos. 16 and 17, which showed viscosity values above the range of the present invention, both $10^{9.5}$ poise, were ruptured.

In contrast, Examples Nos. 1 to 14 according to the present invention showed viscosity values within the range of the present invention ($10^{5.8}$ to $10^{9.0}$

TABLE 1

|  | SODA LIME QUARTZ GLASS | LOW ALKALI GLASS | NO-ALKALI GLASS |
|---|---|---|---|
| COMPOSITION (WEIGHT %) |  |  |  |
| $SiO_2$ | 72~73 | 56~58 | 57~59 |
| $Al_2O_3$ | 1.0~1.5 | 5~7 | 13~15 |
| $Fe_2O_3$ | approx. 0.1 | approx. 0.1 |  |
| $B_2O_3$ |  |  | 9~11 |
| $ZrO_2$ |  | 2~3 |  |
| MgO | 4~5 | 2~3 | 1~2 |
| CaO | 8~9 | 4~6 | 3~5 |
| SrO |  | 5~7 | 3~4 |
| BaO |  | 6~8 | 4.5~6 |
| $Na_2O$ | 12.5~13.5 | 3.5~5.0 | 0.1 |
| $K_2O$ | 0.5~1.2 | 5~8 |  |
| COEFFICIENT OF LINEAR EXPANSION (1/° C.) | 88~92 | 76~84 | 35~40 |
| ANNEALING TEMPERATURE (° C.) | 550~555 | 620~625 | 708~720 |
| DEFORMATION POINT (° C.) | 507~520 | 570~580 | 668~680 |
| SPECIFIC GRAVITY (g/cm³) | 2.47~2.52 | 2.70~2.81 | 2.5~2.55 |

TABLE 2

|  |  | MOTHER GLASS |  | MANUFACTURING CONDITIONS |  |  |  |
|---|---|---|---|---|---|---|---|
|  |  | CATEGORY | CROSS-SECTIONAL SIZE | ASPECT RATIO A | FEED SPEED | DRAWING SPEED | DRAWING SPEED/ FEED SPEED | VISCOSITY/ TEMPERATURE |
| EXAMPLES ACCORDING TO PRESENT INVENTION | 1 | SODA LIME | 23.8 × 2.0 | 11.9 | 10 | 900 | 90 | 5.8/850 |
|  | 2 | SODA LIME | 74.9 × 3.3 | 22.7 | 5 | 1140 | 228 | 6.0/860 |
|  | 3 | SODA LIME | 182.0 × 5.0 | 36.4 | 3 | 3330 | 1110 | 6.8/780 |
|  | 4 | SODA LIME | 66.4 × 1.8 | 36.9 | 2 | 7200 | 3600 | 8.5/680 |
|  | 5 | SODA LIME | 36.1 × 1.9 | 19.0 | 3 | 300 | 100 | 7.4/760 |
|  | 6 | SODA LIME | 69.5 × 3.2 | 21.7 | 3 | 1570 | 523 | 8.2/690 |
|  | 7 | SODA LIME | 69.5 × 3.2 | 21.7 | 3 | 6270 | 2090 | 8.2/690 |
|  | 8 | SODA LIME | 25.0 × 2.0 | 12.5 | 10 | 950 | 95 | 5.1/930 |
|  | 9 | SODA LIME | 28.8 × 2.0 | 14.4 | 3 | 620 | 310 | 9.0/660 |
|  | 10 | LOW ALKALI | 30.0 × 2.8 | 10.7 | 5 | 760 | 152 | 6.9/890 |
|  | 11 | LOW ALKALI | 54.6 × 2.8 | 19.5 | 3 | 520 | 173 | 7.3/850 |
|  | 12 | NO-ALKALI | 10.4 × 0.7 | 14.9 | 5 | 310 | 62 | 7.7/940 |
|  | 13 | NO-ALKALI | 19.0 × 1.1 | 17.3 | 15 | 560 | 37 | 6.8/1000 |
|  | 14 | NO-ALKALI | 8.4 × 1.1 | 7.6 | 7 | 175 | 25 | 8.3/890 |
| COMPARATIVE EXAMPLES | 15 | SODA LIME | 18.0 × 2.0 | 9.0 | 5 | 450 | 90 | 4.2/100 |
|  | 16 | SODA LIME | 74.9 × 3.3 | 22.7 | 5 | 1140 | 228 | 9.5/650 |
|  | 17 | LOW ALKALI | 30.0 × 2.8 | 10.7 | 5 | 760 | 152 | 9.5/740 |
|  | 18 | LOW ALKALI | 30.0 × 2.8 | 10.7 | 5 | 760 | 152 | 4.0/1130 |
|  | 19 | NO-ALKALI | 10.4 × 0.7 | 14.9 | 5 | 310 | 62 | 3.9/1400 |

|  |  | MANUFACTURING RESULTS |  |  | ASPECT RATIO PROPORTION R ((B/A) × 100%) |
|---|---|---|---|---|---|
|  |  | CROSS-SECTIONAL SIZE | ASPECT RATIO B | FLAT PORTION |  |
| EXAMPLES ACCORDING TO PRESENT INVENTION | 1 | 2.08 × 0.24 | 8.7 | PRESENT | 73.1 |
|  | 2 | 4.70 × 0.23 | 20.4 | PRESENT | 89.9 |
|  | 3 | 4.80 × 0.15 | 32.0 | PRESENT | 87.9 |
|  | 4 | 1.11 × 0.03 | 37.0 | PRESENT | 100.3 |
|  | 5 | 3.40 × 0.19 | 17.9 | PRESENT | 94.2 |
|  | 6 | 2.80 × 0.14 | 20.0 | PRESENT | 92.2 |
|  | 7 | 1.40 × 0.07 | 20.0 | PRESENT | 92.2 |
|  | 8 | 2.12 × 0.24 | 8.8 | PRESENT | 70.4 |
|  | 9 | 2.00 × 0.14 | 14.3 | PRESENT | 99.3 |

TABLE 2-continued

|  |  | 10 | 2.13 × 0.22 | 9.7 | PRESENT | 90.7 |
|---|---|---|---|---|---|---|
|  |  | 11 | 3.90 × 0.21 | 18.6 | PRESENT | 95.4 |
|  |  | 12 | 1.20 × 0.09 | 13.3 | PRESENT | 89.3 |
|  |  | 13 | 2.74 × 0.18 | 15.2 | PRESENT | 87.9 |
|  |  | 14 | 1.58 × 0.22 | 7.2 | PRESENT | 94.7 |
| COMPARATIVE | EXAMPLES | 15 | 1.12 × 0.34 | 3.3 | ABSENT | 36.7 |
|  |  | 16 | (RUPTURED) | — | — | — |
|  |  | 17 | (RUPTURED) | — | — | — |
|  |  | 18 | 1.19 × 0.40 | 3.0 | ABSENT | 28.0 |
|  |  | 19 | 0.52 × 0.21 | 2.5 | ABSENT | 16.8 |

UNIT (CROSS-SECTIONAL SIZE: mm. SPEED: mm/min. VISCOSITY: log (POISE), TEMPERATURE: ° C.)

poise), and hence showed R values falling within a range of 70.4 to 100.3, so that the degree of similarity in cross section between the mother glass 41 and the drawn glass fell within the tolerances, and further a flat portion was formed on each side surface of the drawn glass at a central portion in the direction of the width thereof.

Figure 5:
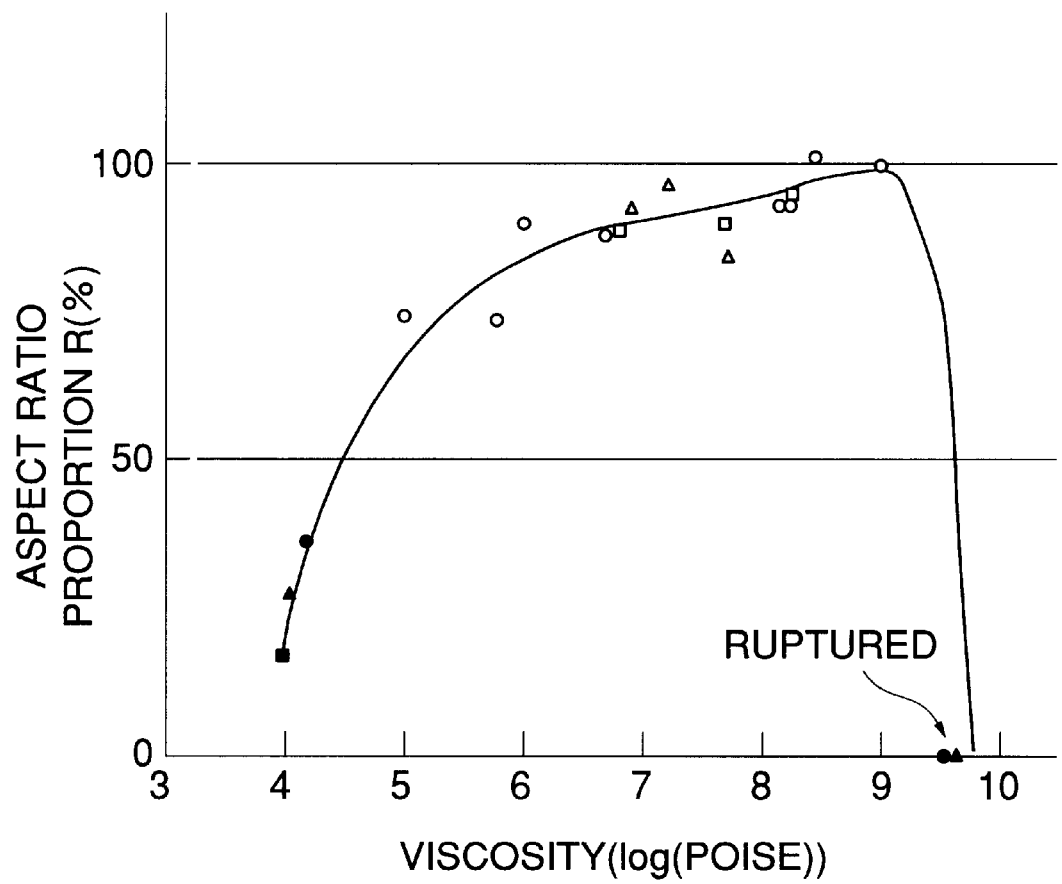
FIG. 5 is a graph showing results of a test for comparing a proportion of aspect ratios A and B to comparing a proportion of aspect ratios A and B to evaluate results of the method of manufacturing glass spacers according to the present invention.

The above described test results of Table 2 are shown as a graph in FIG. 5, where the viscosity (log(poise)) of the manufacturing conditions is represented by the abscissa and the value R (=(B/A)×100%) by the ordinate.

In the graph in FIG. 5, symbols ○, □ and △ represent the results of Examples according to the present invention in which the material of the mother glass 41 is soda lime quartz glass, low alkali glass, and no-alkali glass, respectively, and symbols ●, ■ and ▲ represent the results of Comparative Examples in which the material of the mother glass 41 is soda lime quartz glass, low alkali glass, and no-alkali glass, respectively.

It will be learned from the graph in FIG. 5 that the similarity in cross section (aspect ratio proportion R) between the mother glass 41 and the drawn glass depends on the viscosity (heating temperature) of the mother glass 41. According to the present invention, the viscosity of the glass when heated is kept within the range of $10^5$ to $10^9$ poise. As a result, the R value can be controlled to a tolerable range of approximately 70% or more, to thereby enhance the degree of similarity in cross section between the mother glass 41 and the drawn glass. More specifically, when the viscosity of the mother glass when heated is $10^5$ to $10^6$ poise, the R value can assume approximately 70 to 75%, and when the viscosity of the mother glass when heated is $10^6$ to $10^8$ poise, the R value can assume approximately 75 to 90%. Further, when the viscosity of the mother glass when heated is $10^8$ to $10^9$ poise, the R value can assume approximately 90% or more, that is, nearly 100%, to thereby more positively enhance the degree of similarity in cross section between the mother glass 41 and the drawn glass.

On the other hand, as mentioned above, if the viscosity of the mother glass 41 when heated is less than $10^5$ poise, the R value becomes considerably low such that desired similarity in cross section cannot be obtained, whereas when the viscosity is above $10^9$ poise, the softening degree of the glass will be too low for the mother glass 41 to be drawn, which can result in rupture of the glass.

It should be noted from the graph in FIG. 5 that none of the examples had a value of the aspect ratio B of the drawn glass which was substantially greater than the aspect ratio A of the mother glass 41. It should also be noted from the results that the similarity in cross section does not depend on the material of the the mother glass 41, i.e. it does not depend on whether it is soda lime quartz glass, low alkali glass, or no-alkali glass.

Figure 6A:
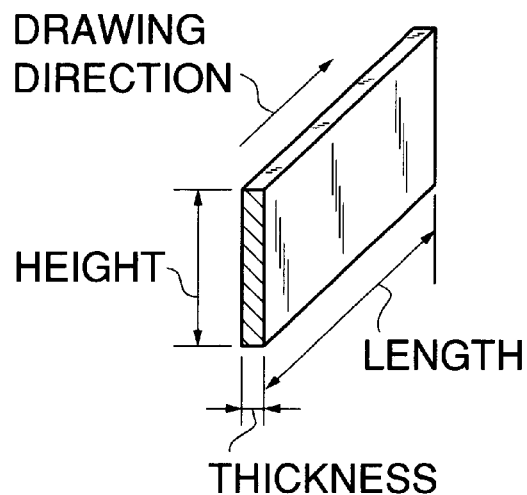
Figure 6B:
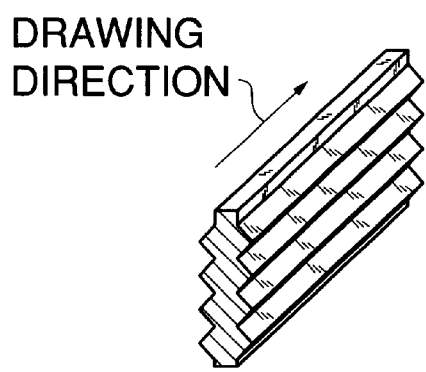
Figure 6C:
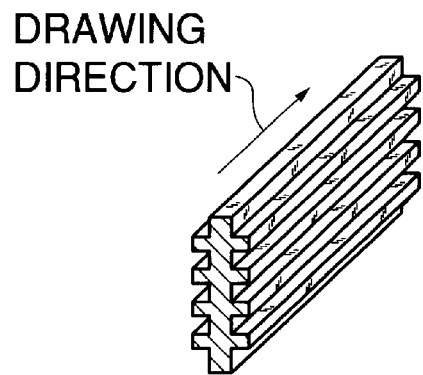
Figure 7A:
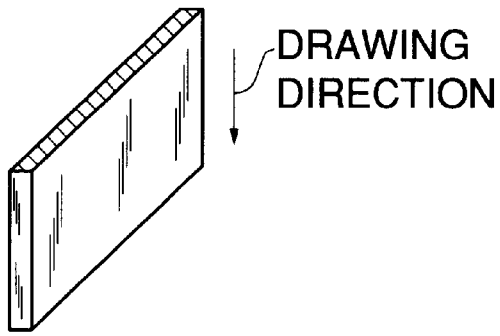
Figure 7B:
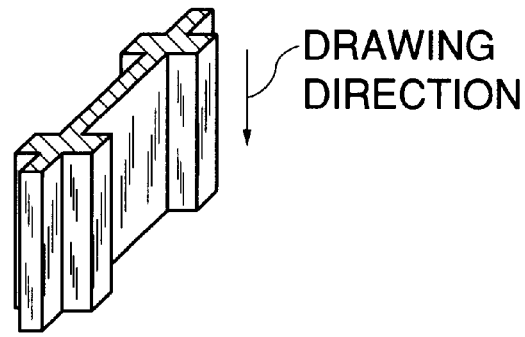

In the above described embodiment and example, a mother glass 41 is drawn in the longitudinal direction of glass spacers 4 to be obtained, and the obtained glass spacers 4 have a simple rectangular cross section (FIG. 6A). However, the present invention may be applied to glass spacers 4 which have a cross section having V-shaped or U-shaped grooves on its opposite lateral sides as shown in FIG. 6B and FIG. 6C, providing substantially the same results as mentioned above. Further, the present invention may be applied to a case where the mother glass 41 is drawn in the transverse direction of glass spacers 4 to be obtained, and the obtained glass spacers 4 have a simple rectangular cross section or have a cross section having wide grooves on its opposite lateral sides as shown in FIG. 7A and FIG. 7B, providing substantially the same results as mentioned above.

It is to be understood that the present invention is not limited to manufacture of glass spacers used exclusively for electron beam-excited displays. For example, the present invention may be applied to a method of manufacturing glass pillars (glass spacers) of a double glazing, which are inserted between two glass panels to maintain a predetermined distance between the two glass panels, wherein the two glass panels extend in parallel and spaced relation with the predetermined distance therebetween and are joined together by a support frame in an airtight manner such that the two glass panels and the support frame form a hermetic atmospheric pressure-resistant structure.

As described above in detail, according to the present invention, the degree of similarity in cross section between the mother glass and the drawn glass can be improved by drawing the mother glass while heating the same to a viscosity of $10^5$ to $10^9$ poise.

Further, according to the present invention, the degree of similarity in cross section between the mother glass and the drawn glass can be positively improved by heating the mother glass to a viscosity of $10^8$ to $10^9$.

What is claimed is:

1. A method of manufacturing glass spacers, comprising the steps of:

preparing a mother glass having a similar cross section to a desired cross section of the glass spacers;

drawing the mother glass while heating the same to a viscosity of $10^8$ to $10^9$ poise; and cutting the drawn glass into a plurality of glass spacers; wherein an aspect ratio proportion is calculated as $$R=(B/A)\times 100\%$$

where R is the aspect ratio proportion, B is an aspect ratio of the glass spacers, and A is an aspect ratio of the mother glass; and wherein the aspect ratio proportion is within a range of 92.2% to 100.3%.

2. A method of manufacturing glass spacers according to claim 1, further comprising the step of feeding the mother glass at a feed speed while drawing the mother glass at a drawing speed, and wherein the drawing speed and the feed speed are in a ratio of 20 to 4000.

3. A method of manufacturing glass spacers as claimed in claim 2, wherein the feed speed is within a range of 3–10 mm/min.

4. A method of manufacturing glass spacers as claimed in claim 2, wherein the drawing speed is within a range of 175–7200 mm/min.

5. A method of manufacturing glass spacers according to claim 1, wherein the glass spacers are tabular and have a thickness of 0.03 to 0.25 mm.

6. A method of manufacturing glass spacers according to claim 1, wherein the glass spacers are tabular and have a height of 0.7 to 5.0 mm.

7. A method of manufacturing glass spacers according to claim 1, wherein the glass spacers are for use in electron beam-excited displays.

* * * * *